US012598437B2

(12) United States Patent
Yamamoto et al.

(10) Patent No.: US 12,598,437 B2
(45) Date of Patent: Apr. 7, 2026

(54) EARPHONES AND EARPHONE SYSTEM

(71) Applicant: JVCKENWOOD Corporation, Yokohama (JP)

(72) Inventors: Hirofumi Yamamoto, Yokohama (JP); Keita Hayashi, Yokohama (JP); Keiji Tsuchiya, Yokohama (JP); Tadashi Ishiwata, Yokohama (JP); Yasufumi Nakaaki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 137 days.

(21) Appl. No.: 18/647,348

(22) Filed: Apr. 26, 2024

(65) Prior Publication Data

US 2024/0276165 A1 Aug. 15, 2024

Related U.S. Application Data

(63) Continuation of application No. PCT/JP2022/033200, filed on Sep. 2, 2022.

(30) Foreign Application Priority Data

Oct. 29, 2021 (JP) ................................ 2021-177236

(51) Int. Cl.

| | |
|---|---|
| ***H05B 47/19*** | (2020.01) |
| ***H04R 29/00*** | (2006.01) |
| ***H05B 47/16*** | (2020.01) |
| ***H05B 47/165*** | (2020.01) |
| *H04R 1/10* | (2006.01) |

(52) U.S. Cl.

CPC ........... *H04R 29/001* (2013.01); *H05B 47/16* (2020.01); *H05B 47/165* (2020.01); *H05B 47/19* (2020.01); *H04R 1/1016* (2013.01); *H04R 2420/07* (2013.01)

(58) Field of Classification Search

CPC ....... H05B 47/19; H05B 47/16; H05B 47/165

See application file for complete search history.

(56) References Cited

U.S. PATENT DOCUMENTS

| | | | | |
|---|---|---|---|---|
| 8,344,901 | B2 * | 1/2013 | Tysowski | G01P 15/00 455/550.1 |
| 2020/0210251 | A1 | 7/2020 | Uemoto et al. | |
| 2020/0320540 | A1 | 10/2020 | Iijima | |

FOREIGN PATENT DOCUMENTS

| | | | | |
|---|---|---|---|---|
| CN | 213094458 U | | 4/2021 | |
| CN | 113068114 A | * | 7/2021 | H04W 76/25 |

(Continued)

OTHER PUBLICATIONS

International Search Report of PCT/JP2022/033200, dated Nov. 8, 2022.

*Primary Examiner* — Olisa Anwah

(74) *Attorney, Agent, or Firm* — PROCOPIO, CORY, HARGREAVES & SAVITCH LLP

(57) ABSTRACT

To provide earphones and an earphone system each adapted to prevent loss of the earphones. An earphone according to an embodiment of the present disclosure includes a light emission unit a detection unit and a light emission control unit. The light emission unit is configured to emit light. The detection unit is configured to detect that the earphone has been dropped. The light emission control unit is configured to control the light emission unit so that it emits light when the detection unit detects that the earphone has been dropped.

4 Claims, 10 Drawing Sheets

(56) References Cited

FOREIGN PATENT DOCUMENTS

| | | | |
|---|---|---|---|
| JP | 2019114198 | A | 7/2019 |
| JP | 2020108125 | A | 7/2020 |

* cited by examiner

EARPHONES AND EARPHONE SYSTEM

CROSS REFERENCE TO RELATED APPLICATION

The present application is based upon and claims the benefit of priority from Japanese Patent Application No. 2021-177236, filed on Oct. 29, 2021, the entire contents of which are hereby incorporated by reference.

BACKGROUND

The present disclosure relates to earphones and an earphone system.

As completely wireless earphones have become popular, the problem of such earphones slipping out the ears has become more apparent. Generally, completely wireless earphones consist of two earphones (i.e., earbuds), and it is often the case that one of the earphones slips out of the ear. Because of the small size of the earphone body part, it is often difficult to find the earphone which has, for example, slipped out of the ear and fallen under a railway station platform or slipped out of the ear and fallen under an object.

Patent Literature 1 (Japanese Unexamined Patent Application Publication No. 2019-114198) discloses a technique related to loss warranty service of completely wireless earphones.

SUMMARY

However, when using the loss warranty service according to Patent Literature 1, it requires much time and effort to have a lost completely wireless earphone covered by warranty. Therefore, it is an issue to prevent the loss of earphones such as completely wireless earphones so that even when the user accidentally drops an earphone, the earphone is not lost, and the user can continue to use it.

An object of the present disclosure is to provide earphones and an earphone system each adapted to prevent loss of the earphones.

According to an embodiment of the present disclosure, an earphone includes:

a light emission unit configured to emit light;

a detection unit configured to detect that the earphone has been dropped; and a light emission control unit configured to control the light emission unit so that it emits light when the detection unit detects that the earphone has been dropped.

According to an embodiment of the present disclosure, an earphone system includes:

a first earphone being an earphone according to claim 1; and a second earphone being an earphone according to claim 1, in which the first and second earphones are configured to communicate wirelessly with each other, and in which, when the detection unit of the first earphone detects that the first earphone has been dropped, the light emission control unit of the second earphone causes the light emission unit of the second earphone to emit light at a timing synchronized with the timing at which the light emission control unit of the first earphone causes the light emission unit of the first earphone to emit light.

According to an embodiment of the present disclosure, another earphone system includes:

a first earphone being an earphone according to claim 1; and a second earphone being an earphone according to claim 1, in which the first and second earphones are configured to communicate wirelessly with each other, in which the second earphone further includes an operation control unit configured to perform control so that information on a user operation is acquired from an operation unit, and in which, when the detection unit of the first earphone detects that the first earphone has been dropped, the light emission control unit of the first earphone causes the light emission unit of the first earphone to emit light at a timing synchronized with the timing at which the user operation is performed which is acquired by the operation control unit of the second earphone.

According to an embodiment of the present disclosure, another earphone system includes:

a first earphone being an earphone according to claim 1; and a second earphone being an earphone according to claim 1, in which the first and second earphones are configured to communicate wirelessly with each other, in which the second earphone further includes a sound output control unit configured to control a sound output unit of the second earphone so that it outputs a sound, and in which, when the detection unit of the first earphone detects that first earphone has been dropped, the sound output control unit of the second earphone causes the second earphone to output a sound at a timing synchronized with the timing at which the light emission control unit of the first earphone causes the light emission unit of the first earphone to emit light.

According to the present embodiment, it is possible to provide earphones and an earphone system each adapted to prevent loss of the earphones.

DETAILED DESCRIPTION

Figure 1:
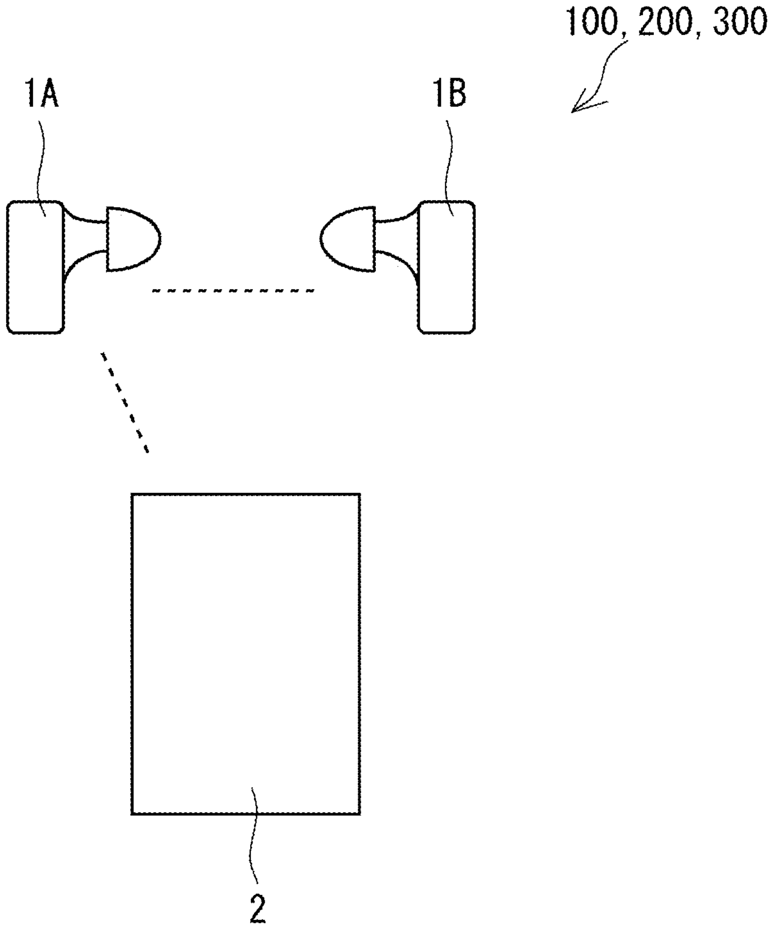
FIG. 1 is a diagram showing a configuration of an earphone system according to first, second, and third embodiments.

Specific embodiments to which the present disclosure is applied will be described in detail below with reference to the drawings. In each drawing, the same elements are assigned the same reference numerals, and duplicate descriptions thereof will be omitted as necessary for the sake of clarity of the description.

First Embodiment

First, a configuration of an earphone system 100 according to a first embodiment will be described with reference to FIG. 1. The earphone system 100 includes an earphone 1A (a first earphone) and an earphone 1B (a second earphone). For example, the earphone 1A is attached to the right ear of the user, and the earphone 1B is an earphone attached to the left ear of the user. Alternatively, the earphone 1B may be attached to the right ear of the user, and the earphone 1A may be attached to the left ear of the user.

The earphone system 100 is a completely wireless earphone system. The earphones 1A and 1B communicate with each other by a wireless communication system such as, for example, Bluetooth (registered trademark). One of the earphones 1A and 1B communicates with an audio apparatus 2 by a wireless communication system. The audio apparatus 2 is, for example, an information terminal such as a smartphone or a tablet or a device such as an audio player.

Description of the earphone system 100 shown in FIG. 1 is given as an example of a communication system, which is a so-called relay system, in which a sound signal is transmitted from the audio apparatus 2 to the earphone 1A and from the earphone 1A to the earphone 1B. The relay system is a connection system in which, for example, when the earphone 1A is a right channel earphone and the earphone 1B is a left channel earphone, the sound signals of the left and right channels are transmitted to the earphone 1A and the sound signal of the left channel is transmitted from the earphone 1A to the earphone 1B. The earphone system 100 is not limited to a relay system, and may be a connection system in which the earphone 1A and the earphone 2A can communicate wirelessly.

Figure 2:
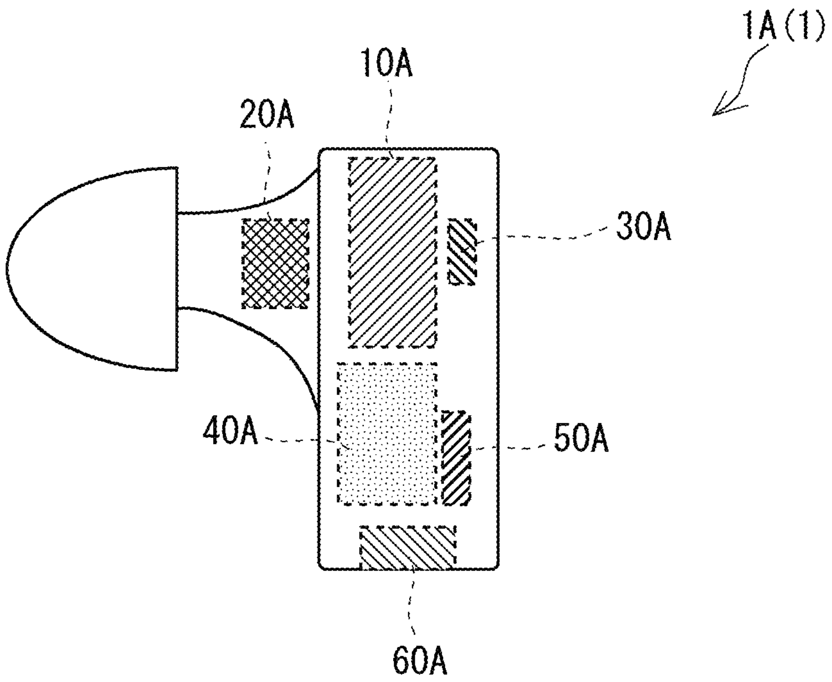
FIG. 2 is a schematic diagram showing a configuration of an earphone according to the first, second, third, and a fourth embodiments.
Figure 3:
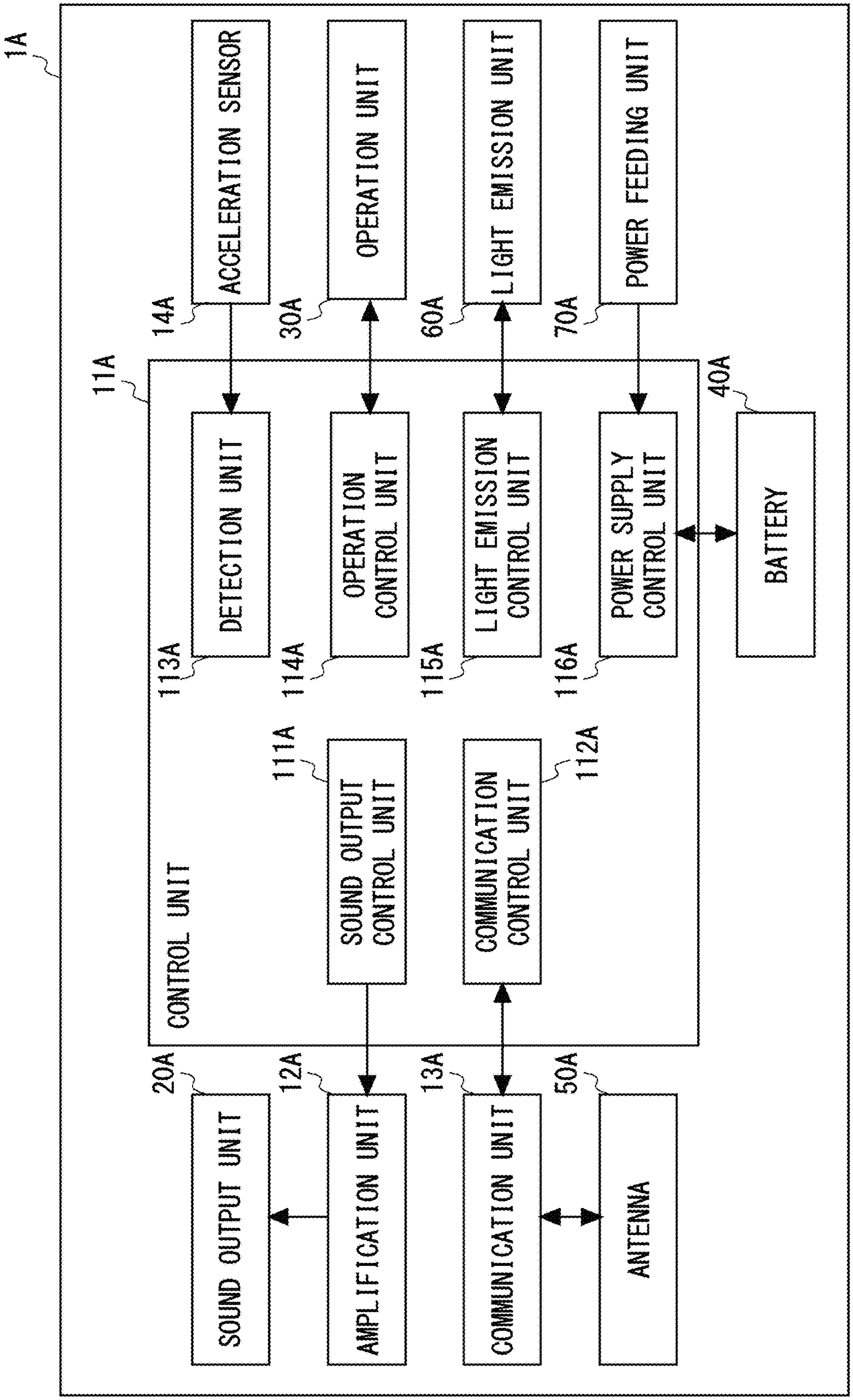
FIG. 3 is a block diagram showing a configuration of the earphone according to the first, second, third, and fourth embodiments.

Next, the configuration of the earphone 1A according to the first embodiment will be described with reference to FIGS. 2 and 3. FIG. 2 is a schematic diagram showing a configuration of the earphone 1A. Therefore, in FIG. 2, a part of the configuration by the block diagram shown in FIG. 3 is omitted. As shown in FIGS. 2 and 3, the earphone 1A includes a substrate 10A, a sound output unit 20A, an operation unit 30A, a battery 40A, an antenna 50A, a light emission unit 60A, and a power feeding unit 70A. The substrate 10A includes a control unit 11A, an amplification unit 12A, a communication unit 13A, and an acceleration sensor 14A.

Since the configuration of the earphone 1B is the same as that of the earphone 1A, the description of the configuration of the earphone 1B will be omitted. The earphone 1B includes a substrate 10B, a sound output unit 20B, an operation unit 30B, a battery 40B, an antenna 50B, a light emission unit 60B, and a power feeding unit 70B corresponding to the substrate 10A, the sound output unit 20A, the operation unit 30A, the battery 40A, the antenna 50A, the light emission unit 60A, and the power feeding unit 70A of the earphone 1A, respectively. The substrate 10B of the earphone 1B includes a control unit 11B, an amplification unit 12B, a communication unit 13B, and an acceleration sensor 14B corresponding to the control unit 11A, the amplification unit 12A, the communication unit 13A, and the acceleration sensor 14A of the substrate 10A of the earphone 1A, respectively.

The substrate 10A is, for example, an electronic circuit board, on which the control unit 11A, the amplification unit 12A, the communication unit 13A, the acceleration sensor 14A and the like are mounted.

The sound output unit 20A is, for example, a driver unit, which converts a sound signal acquired from the amplification unit 12A into sound vibration and outputs it.

The operation unit 30A is, for example, a touch sensor that detects a state in which a user's finger touched the touch sensor or a pressure is applied to the touch sensor as a user operation, and outputs the detected information to the control unit 11A.

The battery 40A is a battery that saves power for driving each component provided in the earphone 1A.

The antenna 50A performs communication with the audio apparatus 2 or the earphone 1B by the communication unit 13A.

The light emission unit 60A is an LED, for example, and emits light based on an instruction from the control unit 11A.

The power feeding unit 70A is a terminal for acquiring power for charging the battery 40A, and can be connected to a battery of an earphone case (not shown) for storing the earphone system 100.

The control unit 11A includes, for example, a microprocessor, a Micro Processing Unit (MPU), or a Central Processing Unit (CPU), and includes an internal memory (not shown). The control unit 11A is a computer that controls various processing of the earphone 1A, loads a stored program into the internal memory, and executes instructions included in the program. Further, the control unit 11A includes a sound output control unit 111A, a communication control unit 112A, a detection unit 113A, an operation control unit 114A, a light emission control unit 115A, and a power supply control unit 116A as functions realized by the configuration of the control unit 11A and program stored therein.

The amplification unit 12A amplifies the sound signal by control of the sound output control unit 111A and outputs the amplified sound signal to the sound output unit 20A.

The communication unit 13A is a communication module that performs Bluetooth communication, for example, and communicates with the earphone 1B or the audio apparatus 2 to transmit and receive information such as sound data and control signals therefrom under the control of the communication control unit 112A.

The acceleration sensor 14A detects acceleration applied to the earphone 1A.

As shown in FIG. 2, the earphone 1A has a body part in which the substrate 10A, the sound output unit 20A, the operation unit 30A, the battery 40A, the antenna 50A, and the light emission unit 60A are installed. A transmissive part is provided in the body part so that light emitted by the light emission unit 60A can be seen from the outside of the body part.

Next, the function realized by the control unit 11A of the earphone 1A according to the first embodiment will be described. Since the function realized by the control unit 11B of the earphone 1B is the same as the function realized by the control unit 11A of the earphone 1A, the description will be omitted. That is, the earphone 1B includes the sound output control unit 111B, the communication control unit 112B, the detection unit 113B, the operation control unit 114B, the light emission control unit 115B, and the power supply control unit 116B corresponding to the sound output control unit 111A, the communication control unit 112A, the detection unit 113A, the operation control unit 114A, the light emission control unit 115A, and the power supply control unit 116A of the control unit 11A of the earphone 1A, respectively.

The sound output control unit 111A performs decoding processing based on the format of the sound data received by the communication unit 13A. The sound output control unit 111A controls the amplification unit 12A. The sound output control unit 111A amplifies the decoded sound signal to a desired output level by the amplification unit 12A, and supplies it to the sound output unit 20A to thereby output it as sound.

The communication control unit 112A controls radio communication by the communication unit 13A. The communication unit 13A communicates with the communication unit 13B of the earphone 1B via the antenna 50A based on the control performed by the communication control unit 112A. The communication control unit 112A controls reception of sound data from the audio apparatus 2 by the communication unit 13A via the antenna 50A.

The detection unit 113A detects the impact on the earphone 1A upon it being dropped, that is, detects that the earphone 1A has been dropped, based on the detection result of the acceleration applied to the earphone 1A detected by the acceleration sensor 14A. Based on the output value of the acceleration sensor 14A, the detection unit 113A determines that the earphone 1A has been dropped when a value indicating acceleration generated when the earphone 1A is dropped and hits the ground or the like is detected.

When the detection unit 113A detects that the earphone 1A has been dropped, the light emission control unit 115A controls the light emission unit 60A so that it emits light. When the detection unit 113A detects that the earphone 1A has been dropped, the light emission control unit 115A transmits information, to the light emission control unit 115B of the earphone 1B via the communication unit 13A and the communication unit 13B, on the timing at which it causes the light emission unit 60A to emit light. The light emission control unit 115B of the earphone 1B causes the light emission unit 60B to emit light at a timing synchronized with the timing at which the light emission control unit 115A causes the light emission unit 60A to emit light.

The operation control unit 114A controls the operation unit 30A and inputs user operation information. When the light emission unit 60A is emitting light, the operation control unit 114A controls the operation unit 30A so that the user can execute the operation to terminate the light emission of the light emission unit 60A (hereinafter referred to as the light emission termination operation).

When the power is supplied from the power feeding unit 70A, the power supply control unit 116A controls the charging of the battery 40A.

Figure 4:
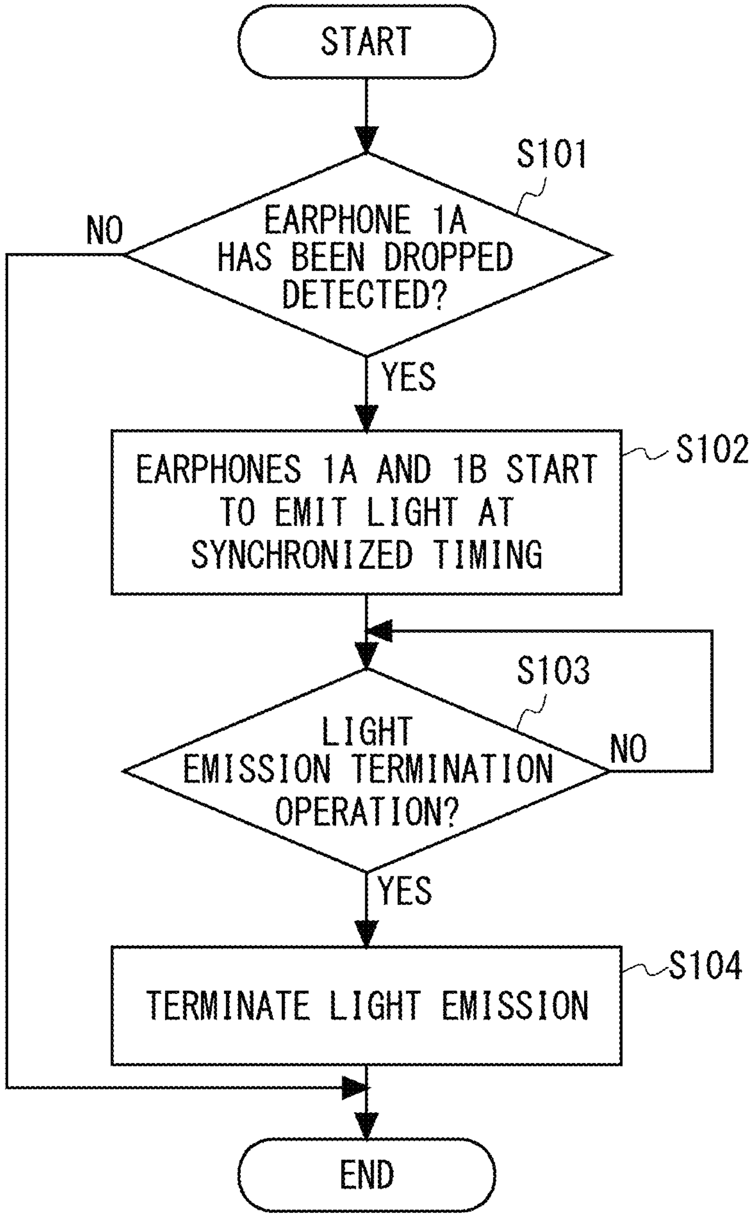
FIG. 4 is a flowchart showing an operation of the earphone system according to the first embodiment.

Next, the operation of the earphone system 100 according to the first embodiment will be described with reference to FIG. 4. The following is an example in which the earphone 1A has been dropped. The processing shown in FIG. 4 may be executed periodically, and the processing may be started when it is detected that the earphone 1A has been dropped. When the processing is started when it is detected that the earphone 1A has been dropped, the processing of Step S101 is omitted.

First, the detection unit 113A of the earphone 1A which has been dropped determines whether or not it is detected that the earphone 1A has been dropped (Step S101). The detection unit 113A of the earphone 1A detects that the earphone 1A has been dropped based on the acceleration detected by the acceleration sensor 14A.

When the detection unit 113A of the earphone 1A does not detect that the earphone 1A has been dropped (NO in Step S101), the earphone system 100 does not execute the processing of Step S102 to Step S104, which will be described later, and ends the processing.

On the other hand, when the detection unit 113A of the earphone 1A detects that the earphone 1A has been dropped (YES in Step S101), the earphone system 100 proceeds to the processing of Step S102.

In Step S102, both the light emission control unit 115A of the earphone 1A which has been dropped and the light emission control unit 115B of the earphone 1B which has not been dropped start to cause the light emission unit 60A and the light emission unit 60B to emit light, respectively, at a synchronized timing. Specifically, the light emission control unit 115A of the earphone 1A causes the light emission unit 60A to emit light. Further, the light emission control unit 115A transmits information, to the light emission control unit 115B of the earphone 1B via the communication unit 13A and the communication unit 13B, on the timing at which the light emission unit 60A emits light. The light emission control unit 115B of the earphone 1B causes the light emission unit 60B to emit light at a timing synchronized with the timing at which the light emission control unit 115A causes the light emission unit 60A to emit light.

Figure 5:
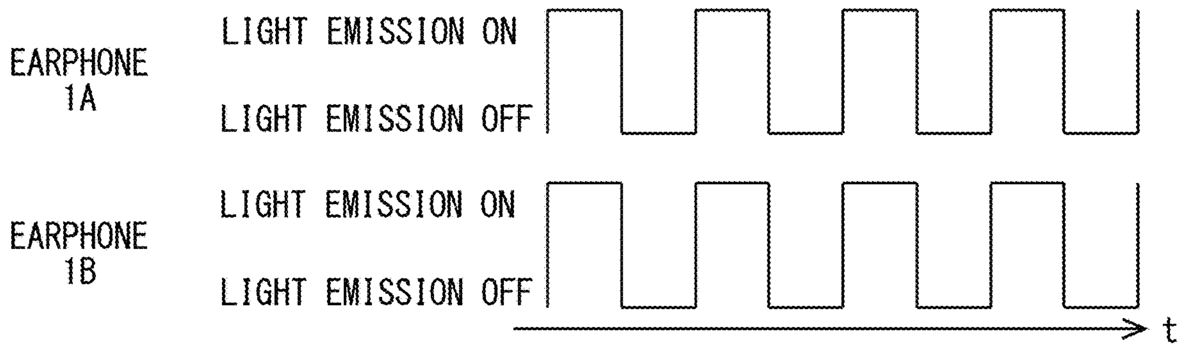
FIG. 5 is a timing chart showing the timing at which an earphone 1A which has been dropped emits light and the timing at which an earphone 1B which has not been dropped emits light according to the first embodiment.
Figure 6:
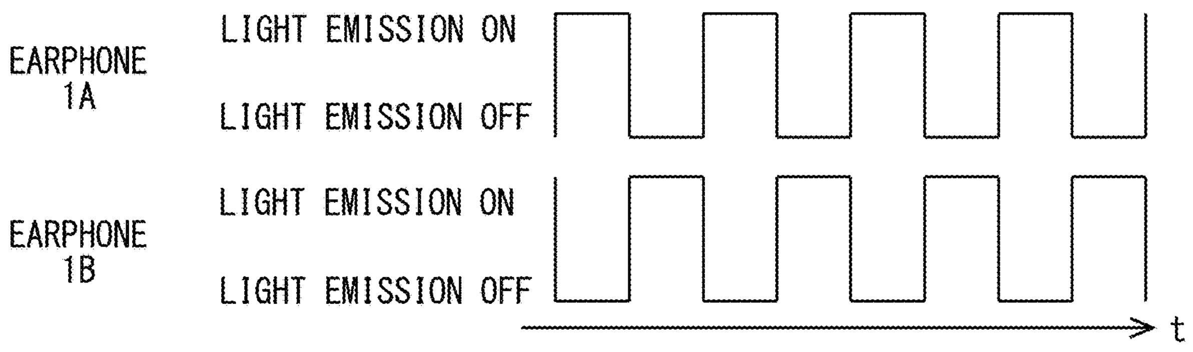
FIG. 6 is a timing chart showing the timing at which the earphone 1A which has been dropped emits light and the timing at which the earphone 1B which has not been dropped emits light according to the first embodiment.

FIGS. 5 and 6 are timing charts showing the timing at which the light emission unit 60A of the earphone 1A which has been dropped emits light and the timing at which the light emission unit 60B of the earphone 1B which has not been dropped emits light. The timing charts shown in FIGS. 5 and 6 show the corresponding relationship between the timing at which the light emission unit 60A of the earphone 1A emits light and the timing at which the light emission unit 60B of the earphone 1B emits light per given time (t).

In one example shown in FIG. 5, when the light emission unit 60A of the earphone 1A emits light (light emission ON in this drawing), the light emission unit 60B of the earphone 1B emits light (light emission ON in this drawing). On the other hand, when the light emission unit 60A of the earphone 1A does not emit light (light emission OFF in this drawing), the light emission unit 60B of the earphone 1B does not emit light (light emission OFF in this drawing). In other words, the light emission unit 60A of the earphone 1A and the light emission unit 60B of the earphone 1B emit light at the same timing, and when the light emission ON and the light emission OFF are repeated, they flicker at the same timing.

On the other hand, in the example shown in FIG. 6, when the light emission unit 60 A of the earphone 1A emits light (the light emission ON in this drawing), the light emission unit 60B of the earphone 1B does not emit light (the light emission OFF in this drawing). When the light emission unit 60A of the earphone 1A does not emit light (light emission OFF in this drawing), the light emission unit 60B of the earphone 1B emits light (light emission ON in this drawing). In other words, the light emission unit 60A of the earphone 1A and the light emission unit 60B of the earphone 1B emit light at alternate timings, and the light emission ON and the light emission OFF are repeated causing the earphones 1A and 1B to flash.

Regarding the flashing cycle shown in FIGS. 5 and 6, the user easily finds the earphone which has been dropped when it flashes in a 1-second cycle, for example. The flashing cycle of the earphone 1A and the earphone 1B is not limited to the examples shown in FIGS. 5 and 6.

FIG. 4 is referred to again. After Step S102, the light emission control unit 115A determines whether or not there is a light emission termination operation (Step S103). The case where there is a light emission termination operation refers to the case where the user finds the earphone 1A which has been dropped and performs, on the operation unit 30A of the earphone 1A or operation unit 30B of the earphone 1B, a light emission termination operation to terminate the light emission of the light emission unit 60A.

When it is determined by the operation control unit 114B that the user has input the light emission termination operation (YES in Step S103), the light emission control unit 115A of the earphone 1A and the light emission control unit 115B of the earphone 1B terminate the light emission of the light emission unit 60A and the light emission unit 60B, respectively (Step S104). Specifically, first, the light emission control unit 115B of the earphone 1B terminates the light emission of the light emission unit 60B. Further, the light emission control unit 115B of the earphone 1B transmits an instruction to terminate the light emission of the light emission unit 60A to the light emission control unit 115A of the earphone 1A through the communication unit 13B and the communication unit 13A of the earphone 1A. When the light emission control unit 115A obtains the instruction, it terminates the light emission of light the emission unit 60A.

On the other hand, when it is determined by the operation control unit 114B of the earphone 1B that the user has not input the light emission termination operation (NO in Step S103), the earphone system 100 repeats the processing of Step S103.

In addition, the user may perform the light emission termination operation on the operation unit 30A of the earphone 1A. In this case, the operation control unit 114A of the earphone 1A acquires information about the light emission termination operation performed by the user via the operation unit 30A. The light emission control unit 115A of the earphone 1A and the light emission control unit 115B of the earphone 1B may terminate the light emission of the light emission unit 60A and the light emission unit 60B, respectively. In addition, not limited to the above-described embodiments, the light emission control unit 115A of the earphone 1A and the light emission control unit 115B of the earphone 1B may terminate the light emission of the light emission unit 60A and the light emission unit 60B, respectively, only when the user inputs the light emission termination operation to both the operation unit 30A of the earphone 1A and the operation unit 30B of the earphone 1B.

While in the above-described embodiments, the operation of the earphone system 100 when the earphone 1A has been dropped is described, the same operation is performed by the earphone system 100 when the earphone 1B has been dropped. That is, it is assumed that the detection unit 113B of the earphone 1B detected that the earphone 1B has been dropped. In this case, the light emission control unit 115A of the earphone 1A makes the light emission unit 60A emit light at a timing synchronized with the timing at which the light emission control unit 115B of the earphone 1B causes the light emission unit 60B to emit light.

As described above, the earphone 1A according to the first embodiment includes the acceleration sensor 14A, the light emission unit 60A, the detection unit 113A, and the light emission control unit 115A. The acceleration sensor 14A detects acceleration. The light emission unit 60A emits light. The detection unit 113A detects that the earphone 1A has been dropped based on the detection result of the acceleration sensor 14A. When the detection unit 113A detects that the earphone 1A has been dropped, the light emission control unit 115A controls the light emission unit 60A so that it emits light.

Therefore, the earphone system 100 according to the first embodiment makes it easier for the user to find the earphone 1A, which the user has accidentally dropped, by the light emission performed by the earphone 1A. Thus, the earphone system 100 is adapted to prevent loss of an earphone.

Furthermore, the earphone system 100 according to the first embodiment includes the earphone 1A and the earphone 1B that communicate with each other. When the detection unit 113A of the earphone 1A detects that the earphone 1A has been dropped, the light emission control unit 115B of the earphone 1B causes the light emission unit 60B to emit light at a timing synchronized with the timing at which the light emission control unit 115A of the earphone 1A causes the light emission unit 60A to emit light. When the detection unit 113B of the earphone 1B detects that earphone 1B has been dropped, the light emission control unit 115A of the earphone 1A causes the light emission unit 60A to emit light at a timing synchronized with the timing at which the light emission control unit 115B of the earphone 1B causes the light emission unit 60B to emit light.

Therefore, in the earphone system 100 according to the first embodiment, since the user can determine the timing at which the earphone which has been dropped emits light from the timing at which the earphone which has not been dropped emits light, it becomes easier for the user to find the earphone which has been dropped.

Second Embodiment

Next, the configuration of an earphone system 200 according to a second embodiment will be described. The earphone system 200 according to the second embodiment includes the earphone 1A and the earphone 1B, as with the earphone system 100 according to the first embodiment, but the functions of each component are different.

The earphone system 200 includes the earphone 1A and the earphone 1B that communicate with each other.

When the detection unit 113A of the earphone 1A detects that the earphone 1A has been dropped, the light emission control unit 115A of the earphone 1A causes the light emission unit 60A to emit light at a timing synchronized with the timing at which the user operation is performed which is included in the user operation information acquired by the operation control unit 114B of the earphone 1B. The user operation information is, for example, a touch operation in which the user touched the operation unit 30B. The operation control unit 114B acquires the timing specified by the user based on whether or not the user touched the operation unit 30B.

When the detection unit of the earphone 1B detects that the earphone 1B has been dropped, the light emission control unit 115B of the earphone 1B causes the light emission unit 60B to emit light at a timing synchronized with the timing at which the user operation is performed which is included in the user operation information acquired by the operation control unit of the earphone 1A.

Figure 7:
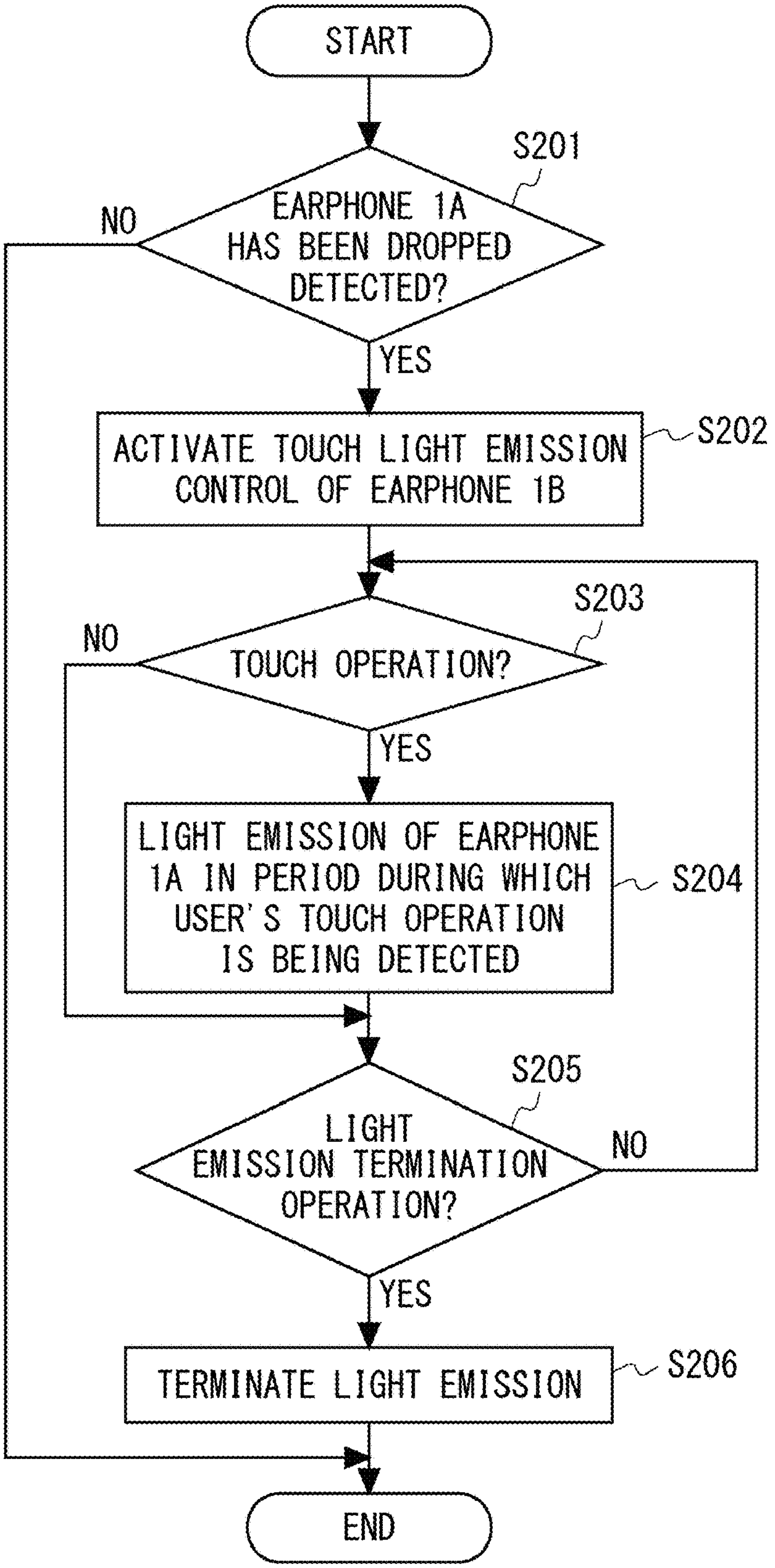
FIG. 7 is a flowchart showing an operation of an earphone system according to the second embodiment.

Next, the operation of the earphone system 200 according to the second embodiment will be described with reference to FIG. 7. The following is an example when the earphone 1A has been dropped. Since Steps S201 and S205 shown in FIG. 7 are the same as Steps S101 and S103 shown in FIG. 4, descriptions thereof will be omitted. When, in Step S201, the detection unit 113A of the earphone 1A does not detect that the earphone 1A has been dropped (NO in Step S201), the earphone system 200 does not execute the processing of Step S202 to Step S206, which will be described later, and ends the processing.

When, in Step S201, the detection unit 113A of the earphone 1A detects that the earphone 1A has been dropped (YES in Step S201), the light emission control unit 115A of the earphone 1A transmits information indicating that the detection unit 113A detected that the earphone 1A has been dropped to the operation control unit 114B of the earphone 1B via the communication unit 13A and the communication unit 13B of the earphone 1B which has not been dropped.

Next, the operation control unit 114B of the earphone 1B activates the touch light emission control performed by the operation unit 30B (Step S202). Touch light emission control is a control that can control the timing at which the light emission unit 60A of the earphone 1A emits light by performing a touch operation on the operation unit 30B of the earphone 1B by the user.

Next, the operation control unit 114B determines whether the user has performed a touch operation on the operation unit 30B (Step S203). When the operation control unit 114B determines that a touch operation on the operation unit 30B has been performed by the user (YES in Step S203), it transmits information indicating that a touch operation has been performed by the user (hereinafter referred to as touch operation information) to the light emission control unit 115A of the earphone 1A via the communication unit 13B and the communication unit 13A. From the received touch operation information, the light emission control unit 115A causes the light emission unit 60A to emit light at a timing corresponding to the period during which the user's touch operation is being detected (hereinafter referred to as a touch detection period) (Step S204).

Figure 8:
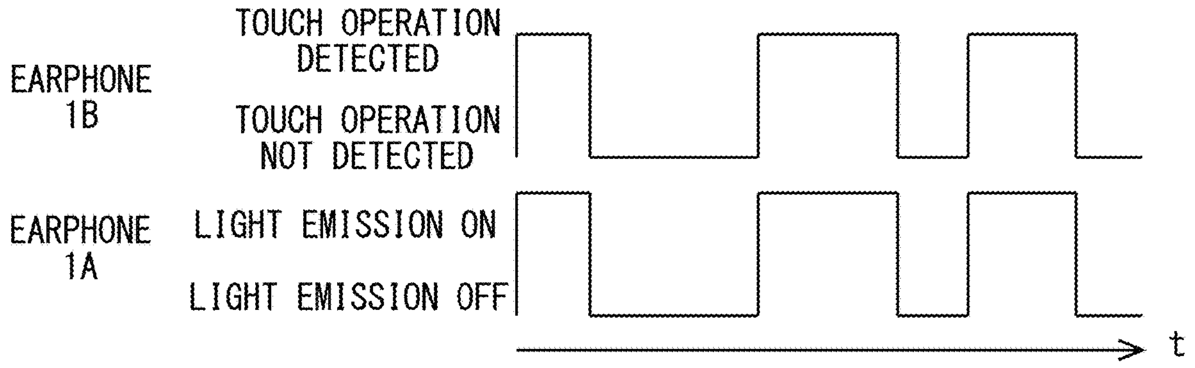
FIG. 8 is a timing chart showing the timing at which user's touch operation of the earphone 1B which has not been dropped is detected and the timing at which the earphone 1A which has been dropped emits light according to the second embodiment.

FIG. 8 is a timing chart showing the timing at which the user's touch operation on the operation unit 30B of the earphone 1B which has not been dropped is performed and the timing at which the light emission unit 60A of the earphone 1A which has been dropped emits light according to the second embodiment. In detail, the timing chart shown in FIG. 8 shows a corresponding relationship between the timing at which the user's touch operation of the operation unit 30B of the earphone 1B which has not been dropped is detected and the timing at which the light emission unit 60A of the earphone 1A which has been dropped emits light per given time (t).

When the user's touch operation of the operation unit 30B of the earphone 1B (touch detection in this drawing) is detected, the light emission unit 60A of the earphone 1A emits light (light emission ON in this drawing). Here, the light emission unit 60A of the earphone 1A continues to emit light during the period in which the user's touch operation of the operation unit 30B of the earphone 1B is detected.

On the other hand, when the user's touch operation of the operation unit 30B of the earphone 1B is not detected (touch operation not detected in this drawing), the light emission unit 60A of the earphone 1A does not emit light (light emission OFF in this drawing).

The description of FIG. 7 is referred to again. When the operation control unit 114B determines in Step S203 that the user is not performing any touch operation on the operation unit 30B (NO in Step S203), the earphone system 200 does not emit light during the touch detection period in Step S204 and proceeds to the processing of Step S205. As a condition for determining that the user is not performing any touch operation on the operation unit 30B, a determination is made that no touch operation is performed after, for example, an elapse of 60 seconds since the touch emission control on the operation unit 30B of the earphone 1B was activated.

After Step S204, the light emission control unit 115A determines whether or not a light emission termination operation has been performed (Step S205). Here, the processing of Step S205 is the same as the processing of Step S103 described above.

When it is determined that a light emission termination operation has been performed (YES in Step S205), the light emission control unit 115A terminates the light emission of the light emission unit 60A (Step S206). Here, the operation control unit 114B of the earphone 1B may deactivate the touch light emission control performed by the operation unit 30B.

On the other hand, when it is determined that the light emission termination operation has not been performed (NO in Step S205), the earphone system 200 returns to the processing of Step S203.

In addition, while in the above-described embodiment, the operation of the earphone system 200 when the earphone 1A has not been dropped is described, the same operation is performed by the earphone system 200 when the earphone 1B has been dropped. That is, it is assumed that the detection unit of the earphone 1B detects that the earphone 1B has been dropped. In this case, the light emission control unit 115B of the earphone 1B causes the light emission unit 60B to emit light at a timing synchronized with the timing at which user operation is performed which is included in the user operation information acquired by the operation control unit of the earphone 1A.

In the earphone system 200 according to the second embodiment, in addition to the effect of the earphone system 100 according to the first embodiment, the user can control the timing at which the earphone which has been dropped emits light, so that the user can more easily find the earphone which has been dropped.

Third Embodiment

Next, the configuration of an earphone system 300 according to a third embodiment will be described.

The earphone system 300 according to the third embodiment includes the earphone 1A and the earphone 1B, as with the earphone system 100 according to the first embodiment, but the functions of each component are different.

The earphone system 300 includes the earphone 1A and the earphone 1B that communicate with each other. When the detection unit 113A of the earphone 1A detects that the earphone 1A has been dropped, the sound output control unit 111B of the earphone 1B causes the sound output unit 20B to output a sound at a timing synchronized with the timing at which the light emission control unit 115A of the earphone 1A causes the light emission unit 60A to emit light. When the detection unit 113B of the earphone 1B detects that the earphone 1B has been dropped, the sound output control unit 111A of the earphone 1A causes the sound output unit 20A to output a sound at a timing synchronized with the timing at which the light emission control unit 115B of the earphone 1B causes the light emission unit 60B to emit light.

Figure 9:
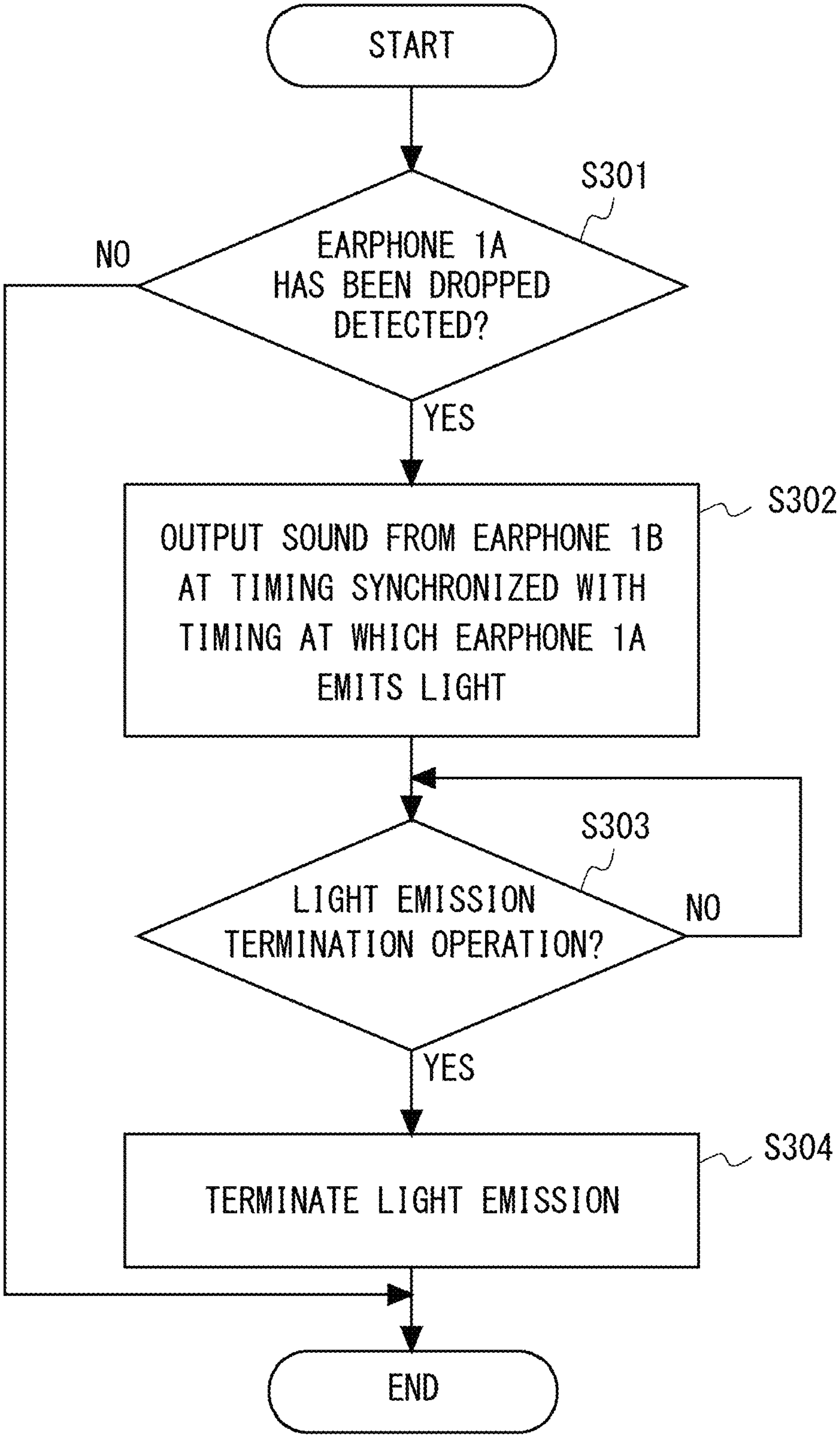
FIG. 9 is a flowchart showing an operation of an earphone system according to the third embodiment.

Next, the operation of the earphone system 300 according to the third embodiment will be described with reference to FIG. 9. The following is an example in which the earphone 1A has been dropped. Since Steps S301 and S303 shown in FIG. 9 are the same as Steps S101 and S103 shown in FIG. 4, descriptions thereof will be omitted.

When, in Step S301, the detection unit 113A of the earphone 1A does not detect that the earphone 1A has been dropped (NO in Step S301), the earphone system 300 does not execute the processing of Step S302 to Step S304, which will be described later, and ends the processing.

When, in Step S301, the detection unit 113A of the earphone 1A detects that the earphone 1A has been dropped (YES in Step S301), the light emission control unit 115A causes the light emission unit 60A to emit light. Further, the light emission control unit 115A transmits information indicating that the detection unit 113A detected that the earphone 1A has been dropped to the sound output control unit 111B of the earphone 1B via the communication unit 13A and communication unit 13B of the earphone 1B which has not been dropped.

Next, the sound output control unit 111B causes the sound output unit 20B of the earphone 1B to output a sound at a timing synchronized with the timing at which the light emission unit 60A of the earphone 1A emits light (Step S302). For example, the sound output control unit 111B causes the sound output unit 20B to output an electronic sound such as "beep" at a timing at which the light emission unit 60A of the earphone 1A emits light.

Figure 10:
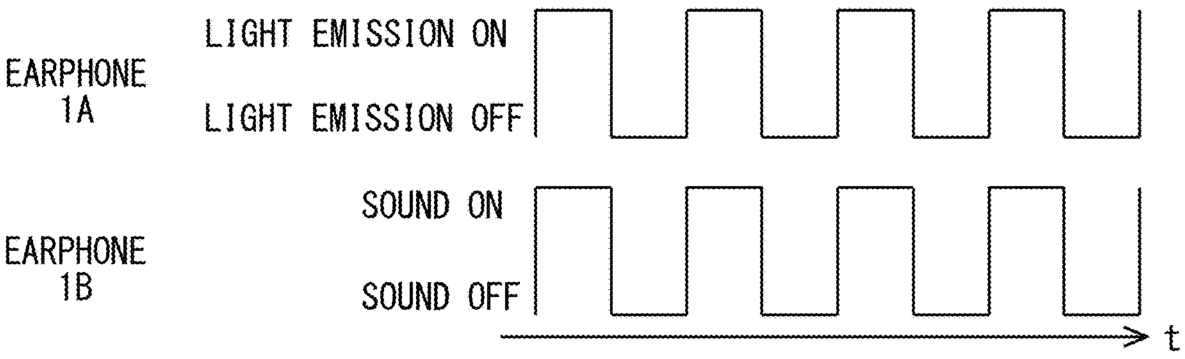
FIG. 10 is a timing chart showing the timing at which the earphone 1A which has been dropped emits light and the timing at which the earphone 1B which has not been dropped outputs a sound according to the third embodiment.

FIG. 10 is a timing chart showing the timing at which the light emission unit 60A of the earphone 1A which has been dropped emits light and the timing at which the sound output unit 20B of the earphone 1B which has not been dropped outputs a sound in the system according to the third embodiment. In detail, the timing chart shown in FIG. 10 shows a corresponding relationship between the timing at which the light emission unit 60A of the earphone 1A which has been dropped emits light and the timing at which the sound output unit 20B of the earphone 1B which has not been dropped outputs a sound per given time (t).

As shown in FIG. 10, when the light emission unit 60A of the earphone 1A emits light (light emission ON in this drawing), a sound is output from the sound output unit 20B of the earphone 1B (sound ON in this drawing). On the other hand, when the light emission unit 60A of the earphone 1A does not emit light (light emission OFF in this drawing), the sound output unit 20B of the earphone 1B does not output a sound (sound OFF in this drawing).

It should be noted that the timing at which the light emission unit 60A of the earphone 1A emits light corresponds to the timing at which the sound output unit 20B of the earphone 1B outputs a sound. For example, when the light emission unit 60A of the earphone 1A emits light, the sound output unit 20B of the earphone 1B does not need to output any sound. When the light emission unit 60A of the earphone 1A does not emit light, the sound output unit 20B of the earphone 1B may output a sound.

The description of FIG. 9 is referred to again. After Step S302, the light emission control unit 115A determines whether or not a light emission termination operation has been performed (Step S303). Here, the processing of Step S303 is the same as the processing of Step S103 described above. When it is determined that a light emission termination operation has been performed (YES in Step S303), the light emission control unit 115A terminates the light emission of the light emission unit 60A (Step S304). Here, the sound output control unit 111B of the earphone 1B may stop the outputting of a sound by the sound output unit 20B.

On the other hand, when it is determined that the light emission termination operation has not been performed (NO in Step S303), the earphone system 300 performs the processing of Step S303 again.

In addition, while in the above-described embodiment, the operation of the earphone system 300 when the earphone 1A has been dropped is described, the same operation is performed by the earphone system 300 when the earphone 1B has been dropped. That is, it is assumed that the detection unit 113B of the earphone 1B detects that the earphone 1B has been dropped. In this case, the sound output control unit 111A of the earphone 1A causes the sound output unit 20A to output a sound at a timing synchronized with the timing at which the light emission control unit 115B of the earphone 1B causes the light emission unit 60B to emit light.

Therefore, in the earphone system 300 according to the third embodiment, in addition to the effect of the earphone system 100 according to the first embodiment, the user can search for the earphone which has been dropped while listening to the sound, so that the user can more easily find the earphone which has been dropped. Furthermore, since the timing at which the earphone which has been dropped emits light is synchronized with the timing at which the earphone which has not been dropped outputs a sound, the user can easily find the earphone which has been dropped.

Fourth Embodiment

Next, the configuration of an earphone system 400 according to a fourth embodiment will be described with reference to FIG. 11.

Figure 11:
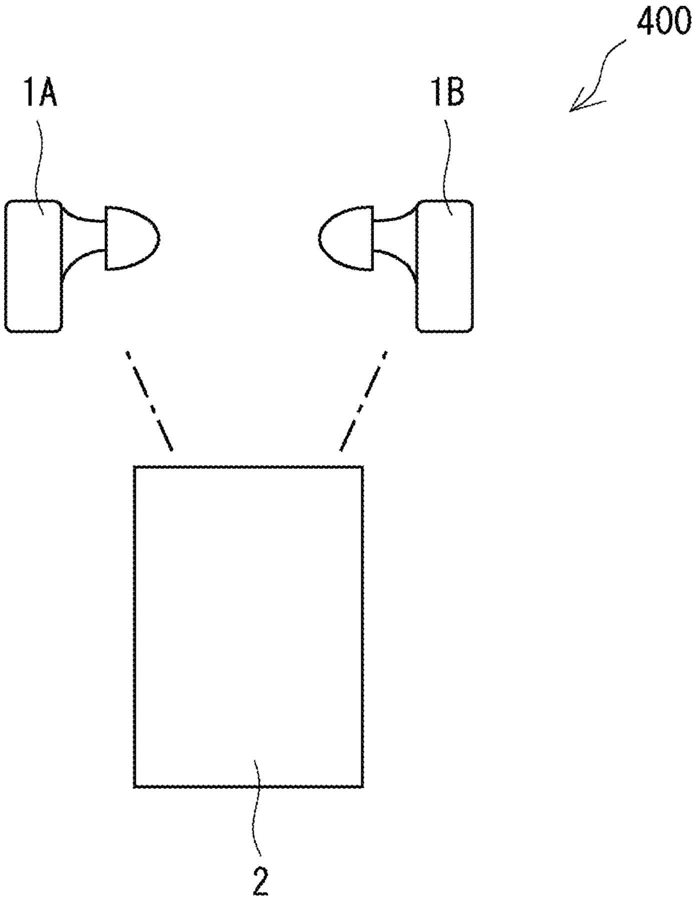
FIG. 11 shows a configuration of an earphone system according to the fourth embodiment.

As shown in FIG. 11, the earphone system 400 according to the fourth embodiment, unlike the earphone system 100 according to the first embodiment, includes the earphone 1A and the earphone 1B, as well as the audio apparatus 2, which is another apparatus.

The earphone 1A and the earphone 1B communicate with each other via the audio apparatus 2 using a so-called left-right simultaneous transmission system. The left-right simultaneous transmission system is a connection system in which, for example, when the earphone 1A is a right-channel earphone and the earphone 1B is a left-channel earphone, the audio apparatus 2 transmits a right-channel sound signal to the earphone 1A and transmits a left-channel sound signal to the earphone 1B. The earphone system 400 is not limited to the left-right simultaneous transmission system and may be a connection system in which the earphone 1A and the earphone 1B can communicate wirelessly via the audio apparatus 2.

The audio apparatus 2 is an apparatus such as an information terminal such as a smartphone or a tablet or an audio player. The audio apparatus 2 has a function of the control unit 11A of the earphone 1A according to the first, second, and third embodiments described above in place of the earphone 1A. The audio apparatus 2 may have a function of the control unit 11B of the earphone 1B according to the first, second, and third embodiments described above in place of the earphone 1B.

Specifically, when the detection unit 113A of the earphone 1A detects that the earphone 1A has been dropped, the audio apparatus 2 performs control instead of the light emission control unit 115A of the earphone 1A to cause the light emission unit 60A of the earphone 1A to emit light. In addition, the audio apparatus 2 performs control instead of the light emission control unit 115B of the earphone 1B to cause the light emission unit 60B of the earphone 1B to emit light. The audio apparatus 2 performs control to cause at least one of the light emission unit 60A and the light emission unit 60B to emit light.

More specifically, when the detection unit 113A of the earphone 1A detects that the earphone 1A has been dropped, the light emission control unit 115A of the earphone 1A transmits information indicating that the detection unit 113A detected that the earphone 1A has been dropped to the audio apparatus 2 via the communication unit 13A. The audio apparatus 2 then causes the light emission unit 60A of the earphone 1A to emit light via the communication unit 13A. The audio apparatus 2 causes, via the communication unit 13B, the light emission unit 60B of the earphone 1B to emit light at a timing synchronized with the timing at which the light emission unit 60A of the earphone 1A emits light.

On the other hand, when the detection unit 113B of the earphone 1B detects that the earphone 1B has been dropped, the light emission control unit 115B of the earphone 1B transmits information indicating that the detection unit 113B detected that the earphone 1B has been dropped to the audio apparatus 2 via the communication unit 13B. Then, the audio apparatus 2 causes the light emission unit 60B of the earphone 1B to emit light via the communication unit 13B. Further, the audio apparatus 2 causes the light emission unit 60A of the earphone 1A to emit light at a timing synchronized with the timing at which the light emission unit 60B of the earphone 1B emits light via the communication unit 13A.

Further, when the detection unit 113A of the earphone 1A detects that the earphone 1A has been dropped, the light emission control unit 115A of the earphone 1A transmits information indicating that the detection unit 113A detected that the earphone 1A has been dropped to the audio apparatus 2 via the communication unit 13A. Thereafter, the audio apparatus 2 receives, from the earphone 1B via the communication unit 13B, the user operation information about the operation performed by the user on the operation unit 30B acquired by the operation control unit 114B of the earphone 1B. The user operation information is, for example, a touch operation in which the user touches the operation unit 30B. The operation control unit 114B acquires the timing at which the user operation is performed based on whether or not the user has touched the operation unit 30B. The audio apparatus 2 causes the light emission unit 60A to emit light via the communication unit 13A at a timing synchronized with the timing specified by the user included in the user operation information.

On the other hand, when the detection unit 113B of the earphone 1B detects that the earphone 1B has been dropped, the light emission control unit 115B of the earphone 1B transmits information indicating that the earphone 1B has been dropped to the audio apparatus 2 via the communication unit 13B. Thereafter, the audio apparatus 2 receives, from the earphone 1A via the communication unit 13A, the user operation information about the operation performed by the user on the operation unit 30A acquired by the operation control unit 114A of the earphone 1A. The audio apparatus 2 causes the light emission unit 60B to emit light via the communication unit 13B at a timing synchronized with the timing specified by the user included in the user operation information.

The audio apparatus 2 may also perform control instead of the sound output control unit 111B of the earphone 1B to cause the sound output unit 20B of the earphone 1B to output a sound, or perform control instead of the sound output control unit 111A of the earphone 1A to cause the sound output unit 20A of the earphone 1A to output a sound.

More specifically, when the detection unit 113A of the earphone 1A detects that the earphone 1A has been dropped, the light emission control unit 115A of the earphone 1A transmits information indicating that the earphone 1A has been dropped to the audio apparatus 2 via the communication unit 13A. The audio apparatus 2 causes the light emission unit 60A of the earphone 1A to emit light. Further, the audio apparatus 2 causes the sound output unit 20B of the earphone 1B to output a sound through the communication unit 13B at a timing synchronized with the timing at which the light emission unit 60A of the earphone 1A emits light.

On the other hand, when the detection unit 113B of the earphone 1B detects that the earphone 1B has been dropped, the light emission control unit 115B of the earphone 1B transmits information indicating that the earphone 1B has been dropped to the audio apparatus 2 through the communication unit 13B. The audio apparatus 2 causes the light emission unit 60B of the earphone 1B to emit light. The audio apparatus 2 also causes the sound output unit 20A of the earphone 1A to output a sound through the communication unit 13A at a timing synchronized with the timing at which the light emission unit 60B of the earphone 1B emits light.

In the earphone system 400 according to the fourth embodiment, the control performed by the earphones 1A and 1B according to the first, second, and third embodiments can be performed by the audio apparatus 2.

Note that the present disclosure is not limited to the above embodiment, and can be appropriately changed to the extent that it does not deviate from the purpose.

In addition, each configuration in the above-described embodiment is composed of hardware and/or software, and may be composed of one hardware and/or software, or may be composed of a plurality of hardware and/or software. The functions (processing) of each configuration in the above-described embodiment may be realized by a computer. For example, a program for performing the method in the embodiment may be stored in an internal memory each of control units (not shown) of the control unit 11 A, the control unit 11B, or the audio apparatus 2, and each function may be realized by executing a program stored in the internal memory each of control units.

These programs include instructions (or software code) for causing the computer to perform one or more functions described in the embodiment when read into the computer. The programs may be stored in a non-transitory computer-readable medium or a substantial storage medium. By way of example, but not limitation, computer-readable medium or a substantial storage medium may include random-access memory (RAM), read-only memory (ROM), flash memory, solid-state drive (SSD) or other memory technologies. Programs may be transmitted over a temporary computer-readable medium or communication medium. By way of example, but not limitation, a temporary computer-readable medium or communication medium may include an electrical, optical, or other form of propagation signal.

The present disclosure can be used for earphones such as wireless earphones.

What is claimed is:

1. An earphone system comprising:

a first earphone; and a second earphone, the first and second earphones are configured to communicate wirelessly with each other, wherein each of the first earphone and the second earphone comprises:

a light emission unit configured to emit light;

a detection unit configured to detect that the earphone has been dropped; and a light emission control unit configured to control the light emission unit so that the light emission unit emits light when the detection unit detects that the earphone has been dropped, and wherein, when the detection unit of the first earphone detects that the first earphone has been dropped, the light emission control unit of the second earphone causes the light emission unit of the second earphone to emit light at a timing synchronized with the timing at which the light emission control unit of the first earphone causes the light emission unit of the first earphone to emit light.

2. An earphone system comprising:

a first earphone; and a second earphone, wherein the first and second earphones are configured to communicate wirelessly with each other, wherein each of the first earphone and the second earphone comprises:

a light emission unit configured to emit light;

a detection unit configured to detect that the earphone has been dropped; and a light emission control unit configured to control the light emission unit so that the light emission unit emits light when the detection unit detects that the earphone has been dropped, wherein the second earphone further comprises an operation control unit configured to perform control so that information on a user operation is acquired from an operation unit, and wherein, when the detection unit of the first earphone detects that the first earphone has been dropped, the light emission control unit of the first earphone causes the light emission unit of the first earphone to emit light at a timing synchronized with the timing at which the user operation is performed which is acquired by the operation control unit of the second earphone.

3. An earphone system comprising:

a first earphone; and a second earphone, wherein the first and second earphones are configured to communicate wirelessly with each other, wherein each of the first earphone and the second earphone comprises:

a light emission unit configured to emit light;

a detection unit configured to detect that the earphone has been dropped; and a light emission control unit configured to control the light emission unit so that the light emission unit emits light when the detection unit detects that the earphone has been dropped, wherein the second earphone further comprises a sound output control unit configured to control a sound output unit of the second earphone so that it outputs a sound, and wherein, when the detection unit of the first earphone detects that first earphone has been dropped, the sound output control unit of the second earphone causes the second earphone to output a sound at a timing synchronized with the timing at which the light emission control unit of the first earphone causes the light emission unit of the first earphone to emit light.

4. The earphone system comprising the first and second earphones according to claim 1, further comprising an apparatus that performs wireless communication with each of the first and second earphones, and wherein, when the detection unit of the first earphone detects that the first earphone has been dropped, the apparatus controls, instead of the light emission control unit of the first earphone, the light emission unit of the first earphone so that it emits light and controls, instead of the light emission control unit of the second earphone, the light emission unit of the second earphone so that it emits light.

* * * * *